United States Patent
Agrawal (10) Patent No.: US 7,702,154 B2
(45) Date of Patent: Apr. 20, 2010

(54) METHOD AND APPARATUS INDENTIFYING HALFTONE REGIONS WITHIN A DIGITAL IMAGE

(75) Inventor: Ram Bhushnan Agrawal, Noida (IN)

(73) Assignee: Adobe Systems, Incorporated, San Jose, CA (US)

( * ) Notice: Subject to any disclaimer, the term of this patent is extended or adjusted under 35 U.S.C. 154(b) by 342 days.

(21) Appl. No.: 11/445,634

(22) Filed: Jun. 2, 2006

(65) Prior Publication Data

US 2007/0165281 A1 Jul. 19, 2007

(30) Foreign Application Priority Data

Jan. 13, 2006 (IN) .......................... 104/DEL/2006

(51) Int. Cl.
G06K 9/34 (2006.01)
G06K 9/46 (2006.01)
G06K 9/66 (2006.01)
(52) U.S. Cl. .................. 382/176; 382/173; 382/194
(58) Field of Classification Search ................ 382/173, 382/176, 194
See application file for complete search history.

(56) References Cited

U.S. PATENT DOCUMENTS

| | | | | | |
|---|---|---|---|---|---|
| 4,722,008 A | * | 1/1988 | Ibaraki et al. | ............... | 382/192 |
| 5,073,953 A | * | 12/1991 | Westdijk | ..................... | 382/176 |
| 5,131,049 A | * | 7/1992 | Bloomberg et al. | ......... | 382/257 |
| 5,193,122 A | * | 3/1993 | Kowalski et al. | ............. | 382/173 |
| 5,293,430 A | * | 3/1994 | Shiau et al. | .................. | 382/173 |
| 5,566,255 A | * | 10/1996 | Pavlidis | ....................... | 382/317 |
| 5,568,571 A | * | 10/1996 | Willis et al. | .................. | 382/254 |
| 5,588,072 A | * | 12/1996 | Wang | ......................... | 382/176 |
| 5,649,026 A | * | 7/1997 | Heins, III | ..................... | 382/175 |
| 5,949,555 A | * | 9/1999 | Sakai et al. | .................. | 358/462 |
| 6,157,736 A | * | 12/2000 | Jodoin et al. | ................. | 382/173 |
| 6,307,962 B1 | * | 10/2001 | Parker et al. | ................. | 382/170 |
| 6,389,163 B1 | * | 5/2002 | Jodoin et al. | ................. | 382/173 |
| 7,292,372 B2 | * | 11/2007 | Fukuda et al. | ............... | 358/2.1 |
| 7,379,594 B2 | * | 5/2008 | Ferman et al. | ............... | 382/176 |

OTHER PUBLICATIONS

Yoshida, M. Takahashi, T. Semasa, T. Ono, F. "Bi-level rendition of images containing text, screened halftone and continuous tone", Global Telecommunications Conference, 1991. GLOBECOM '91. Publication Date: Dec. 2-5, 1991, on pp. 104-109, vol. 1.*

(Continued)

*Primary Examiner*—Samir A. Ahmed
*Assistant Examiner*—Li Liu
(74) *Attorney, Agent, or Firm*—Robert C. Kowert; Meyertons, Hood, Kivlin, Kowert & Goetzel, P.C.

(57) ABSTRACT

One embodiment of the present invention provides a system that identifies halftone regions within a digital image. During operation, the system receives a region from the digital image, wherein the digital image is a bi-level image, wherein each pixel has two possible color values. Next, the system computes a variation index for a region of the digital image, wherein the variation index indicates how frequently adjacent pixel values in the region differ. If the variation index for the region is greater than an upper threshold, the system determines that the region is a halftone region.

20 Claims, 4 Drawing Sheets

OTHER PUBLICATIONS

E. E. Regentova, S. Latifi, D. Chen, K. Taghva and D. Yao, "Document analysis by processing JBIG-encoded images", International Journal on Document Analysis and Recognition. vol. 7, No. 4 / Sep. 2005, pp. 260-272.*

Publication entitled "A Fast Segmentation Algorithm for Bi-Level Image Compression Using JBIG2", by Dave A.D. Tompkins et al., Proceedings of the 1999 IEEE International Conference on Image Processing (ICIP), Kobe, Japan, Oct. 1999.

Publication entitled "The Emerging JBIG2 Standard", by Paul G. Howard et al., Proceedings of the 1999 IEEE Trans. On Circuit and Systems for Video Technology, vol. 8, No. 7, pp. 889-899, Nov. 1998.

"A Fast Segmentation Algorithm for Bi-Level Image Compression Using JBIG2," by Dave A.D. Tompkins, et al., Proceedings of the 1999 IEEE International Conference on Image Processing (ICIP), Kobe, Japan Oct. 1999.

"The Emerging JBIG2 Standard," by Paul G. Howard, et al., Proceedings of the 1999 IEEE Trans. On Circuit and Systems for Video Technology, vol. 8, No. 7, pp. 889-899, Nov. 1998.

Yoshida, et al., "Bi-Level Rendition of Images Containing Text, Screened Halftone and Continuous Tone," Global Telecommunications Conference, 1991, GLOBECOM '91, Publication Date Dec. 2-5, 1991, on pp. 104-109, vol. 1.

Office Action from U.S. Appl. No. 11/445,624, mailed Sep. 4, 2008.

Office Action from U.S. Appl. No. 11/445,624, mailed Jan. 26, 2009.

* cited by examiner

HALFTONE    FIG. 1    GENERIC    SYMBOL
(PRIOR ART)

HALFTONE IMAGE    ENLARGED VIEW

FIG. 6 ns. (FIG. 1 provides an example illustrating these three
METHOD AND APPARATUS INDENTIFYING HALFTONE REGIONS WITHIN A DIGITAL IMAGE

RELATED APPLICATION

This application hereby claims priority under 35 U.S.C. §119 and/or 365 to Indian Patent Application No. 105/DEL/2006, filed on 13 Jan. 2006, entitled "Method and Apparatus for Identifying Halftone Regions a Digital Image", by inventor Ram Bhushan Agrawal.

FIELD OF THE INVENTION

The present invention relates to computer-based tools for manipulating digital images. More specifically, the present invention relates to a method and an apparatus for identifying halftone regions within a digital image.

RELATED ART

The Joint Bi-level Image experts Group has recently developed a new standard called "JBIG2" to facilitate lossy and lossless compression of bi-level (one-bit) images, wherein each pixel can assume one of two possible color values (0 or 1).

Figure 1:
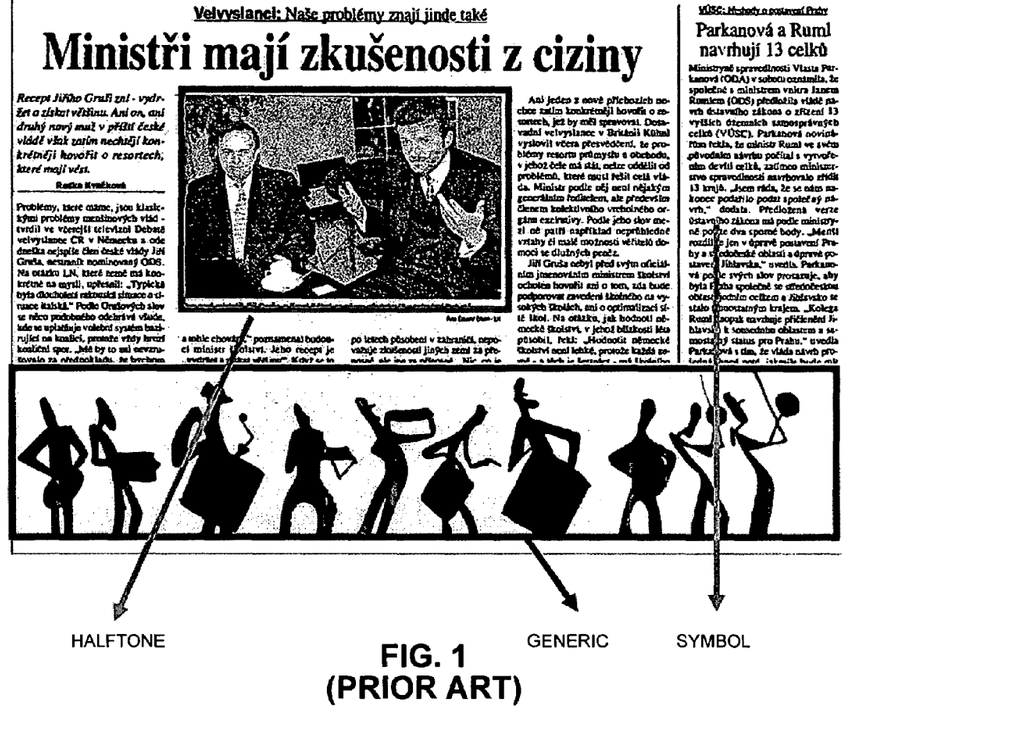
FIG. 1 illustrates different types of regions in a bi-level image.

During the JBIG2 encoding process, the encoder segments a given image into three types of regions: text regions (also called "symbol regions") containing text and/or symbols, halftone regions containing halftone images, and generic regions, which are neither halftone regions nor symbol regions. (FIG. 1 provides an example illustrating these three types of regions). A different type of encoding is applied to each type of region to achieve a high level of compression.

Techniques to differentiate symbol regions from generic regions are known publicly. However, at present there are no known publicly known techniques for identifying halftone regions.

Figure 2:
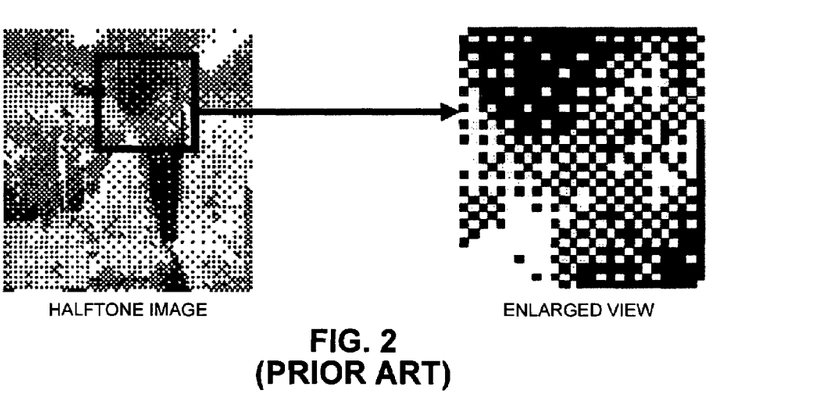
FIG. 2 illustrates an exemplary halftone image.

Note that a halftone image is actually a bi-level image having pixel values that can be either 0 or 1. However, when one views a halftone image from some distance it has the appearance of a grayscale image (or a continuous tone image). One commonly finds halftone images in newspapers and facsimile documents. Halftone images are made from different patterns, wherein each pattern corresponds to a specific grayscale level (see FIG. 2). These patterns may be constructed at different sizes and at different orientations. Hence, one can generate several types of halftone images from a given grayscale image.

Because there is no good publicly known technique for identifying halftone regions, and because incorrect identification of a non-halftone region as halftone region leads to unacceptable quality of the output image, most existing JBIG2 encoders take the conservative approach and encode halftone regions as generic regions. Unfortunately, this leads to sub-optimal compression.

Hence, what is needed is a method and an apparatus for identifying halftone regions within a bi-level image.

SUMMARY

One embodiment of the present invention provides a system that identifies halftone regions within a digital image. During operation, the system receives a region from the digital image, wherein the digital image is a bi-level image, wherein each pixel has two possible color values. Next, the system computes a variation index for a region of the digital image, wherein the variation index indicates how frequently adjacent pixel values in the region differ. If the variation index for the region is greater than an upper threshold, the system determines that the region is a halftone region.

In a variation on this embodiment, if the variation index for the region is smaller than a lower threshold, the system tests to see whether there exist black patches in the region. If so, the system determines that the region is a generic region, which is neither a halftone region nor a symbol region. If not, the system determines that the region is a symbol region containing text and/or symbols.

In a further variation, if the variation index for the region is between the lower threshold and the upper threshold, the system tests to see whether there exist black patches in the region. If so, the system tests to see whether the variation index is greater than a middle threshold. If the variation index is greater than the middle threshold, the system determines that the region is a halftone region. Otherwise, the system determines that the region is a generic region. On the other hand, if no black patches exist in the region, the system performs a morphological erosion operation on the region, and then computes a new variation index for the eroded region. If the new variation index is greater than a post-erosion threshold, the system determines that the region is a halftone region. Otherwise, the system determines that the region is a generic region.

In a variation on this embodiment, computing the variation index for the region involves: scanning through pixels in the region row-by-row in a horizontal direction counting transitions from zero-to-one and from one-to-zero; scanning through pixels in the region column-by-column in a vertical direction counting transitions from zero-to-one and from one-to-zero; and dividing the total number of transitions by twice the number of pixels in the region.

In a variation on this embodiment, the system encodes the halftone region using a different encoding technique than is used to encode a generic region or a symbol region.

In a further variation, encoding the halftone region involves encoding the halftone region as a grayscale image with an associated halftone pattern dictionary.

In a variation on this embodiment, prior to receiving the region from the digital image, the system partitions the digital image into different regions.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

General Approach

A significant problem in designing a practical and useful technique for identifying halftone regions is that most real-world images do not have a clear-cut separation between halftone regions and text regions. There often exist scanning artifacts, and complicated cases, such as text written above a shaded background, text written in reverse (white on black background), image regions obtained by thresholding a gray-scale image, and a mix of these problems.

A practical technique should ideally address these issues, and should work satisfactorily on most of these cases. Moreover, the technique should not identify a non-halftone region as halftone region. Otherwise, the encoder will apply halftoning on such regions, which will result in unacceptable output image.

There are significant differences between halftone images and text images or generic images. One such visible difference is the variation between neighboring pixels. In case of text images (and to a lesser extent generic images), pixel variation is low. In contrast, within halftone images pixel variation is high.

Based on this observation the present invention makes use of a "variation index," which is calculated over all pixels in the image. To calculate this variation index, we go through each pixel in horizontal direction, line by line. For every flip in the color (black-to-white or white-to-black) a counter is incremented. Then the process is repeated in vertical direction, column by column. The total number of counted "flips" is then divided by twice the total number of pixels in the image to calculate the AVI. AVI is generally high for halftone images and is low for text images and generic regions.

Another observation is that halftone images do not contain big black patches. This observation helps to discard erroneous candidates for halftone images.

In some cases, we also perform "bad-scan" test to ensure that we do not accidentally consider a badly-scanned region to be a halftone region. To perform this test, we first perform a morphological erosion operation on the image and calculate AVI' for the eroded image. Then, based on the value of AVI', we determine whether the region is a halftone region or a generic region.

We describe these techniques in more detail below, but first we describe the encoding process.

Compression Process

Figure 3A:
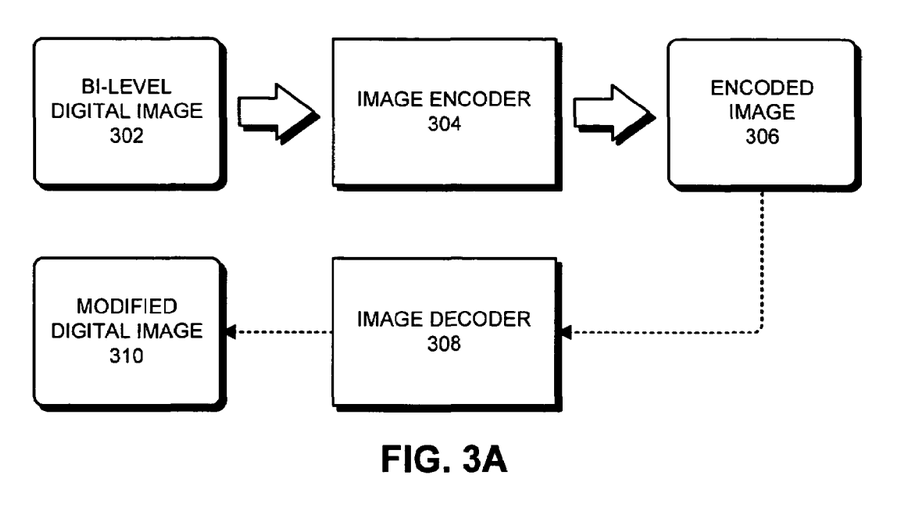
FIG. 3A illustrates the compression process for a bi-level image in accordance with an embodiment of the present invention.

FIG. 3A illustrates the compression process for a bi-level image in accordance with an embodiment of the present invention. The system starts with a bi-level digital image 302 having pixel values of either zero or one. This bi-level image feeds through an image encoder 304, which compresses the bi-level image to produce an encoded image 306.

In the reverse direction, an image decoder 308 can be used to decode the encoded image 306 to produce a modified digital image 310, which is slightly different than the original image.

In one embodiment of the present invention, encoder 304 adheres to the JBIG2 encoding standard, which has two encoding modes: "lossy" and "lossless." In the lossless encoding mode, the decoded image will look exactly like the original image pixel by pixel. However, in the lossy encoding mode, there will be a few differences between the decoded image and the original image. Typically, these differences are minor, and are acceptable to the user. Hence, in the lossy encoding mode, image decoder 308 will produce a modified digital image 310, which is slightly different then the original bi-level digital image 302. (Note that the halftone encoding process in JBIG2 is applied ONLY in the case of lossy coding.)

Encoding Process

Figure 3B:
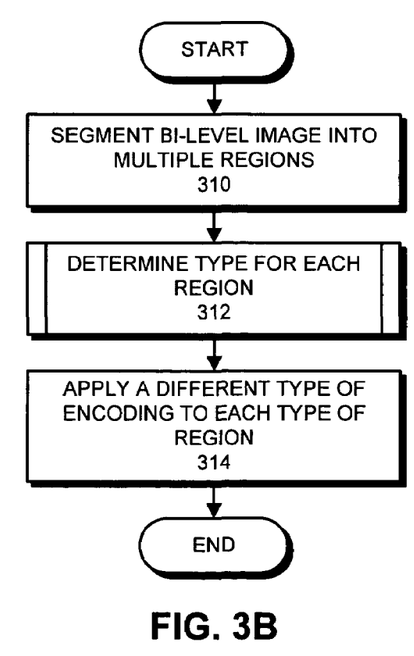
FIG. 3B presents a flow chart illustrating the process of encoding a bi-level image in accordance with an embodiment of the present invention.

FIG. 3B presents a flow chart illustrating the process of encoding a bi-level image in accordance with an embodiment of the present invention. First, the bi-level digital image is segmented into multiple regions (step 310). (This can be accomplished by using any of a number of well-known segmentation techniques. (For more details on such techniques, please refer to Dave A. D. Tompkins and Faouzi Kossentini, "A Fast Segmentation Algorithm for Bi-Level Image Compression Using JBIG2," *Proceedings of the* 1999 *IEEE International Conference on Image Processing* (ICIP), Kobe, Japan, October 1999.) Next, the system determines the image type for each region (step 312). For example, a given region can be identified as a symbol region, a halftone region or a generic region. This process of identifying the image type for a region is described in more detail below with reference to the flow chart illustrated in FIG. 4.

Finally, the system applies a different type of encoding to each type of region (step 314). A generic region can be encoded directly as a bitmap with arithmetic coding. A halftone region can be encoded as both a grayscale image and a halftone pattern dictionary. In a symbol region, symbols can be stored in dictionaries, and the encoded symbol region can contain information specifying the locations of symbols within the symbol region.

Identification of a Region in a Bi-Level Image

Figure 4:
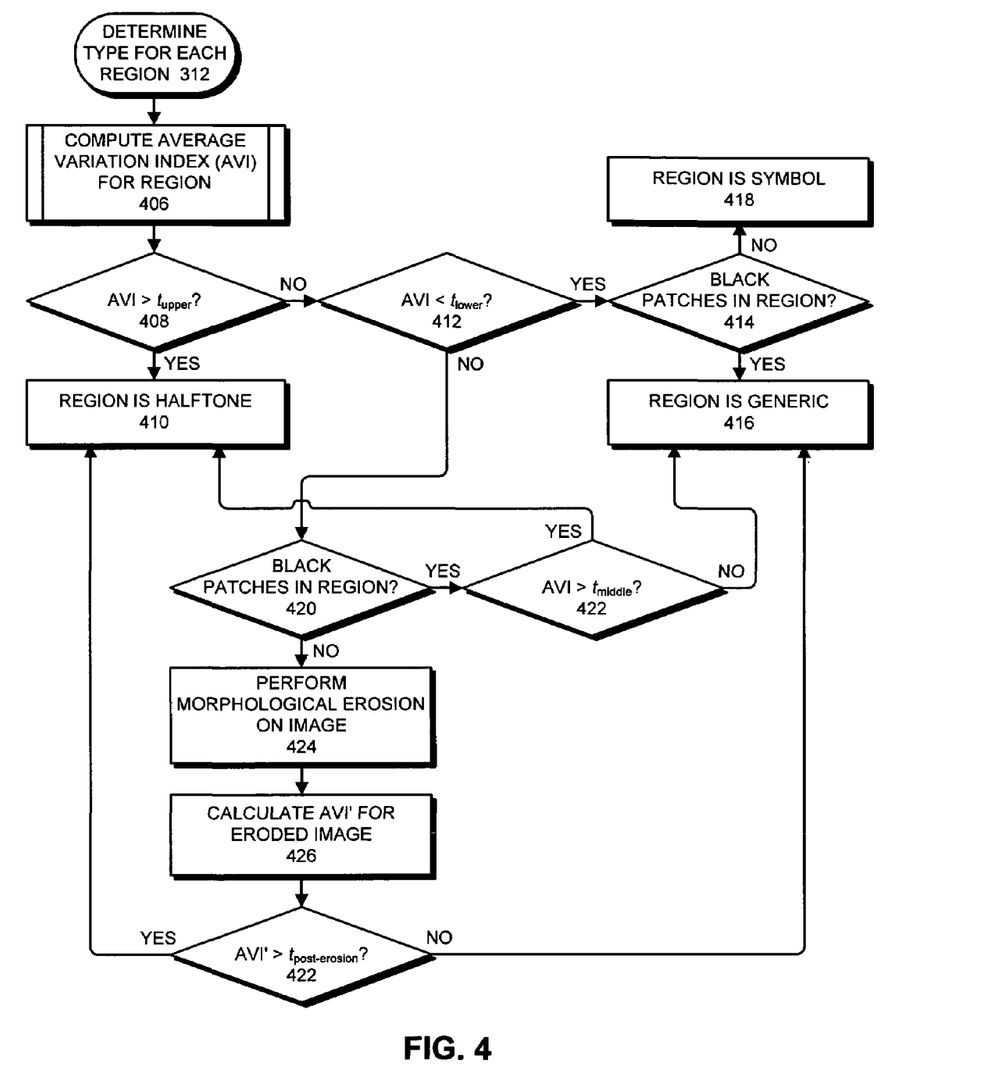
FIG. 4 presents a flow chart of the process of identifying an image type for a region within a bi-level image in accordance with an embodiment of the present invention.

FIG. 4 presents a flow chart illustrating the process of determining the image type of a region in accordance with an embodiment of the present invention.

Figure 5:
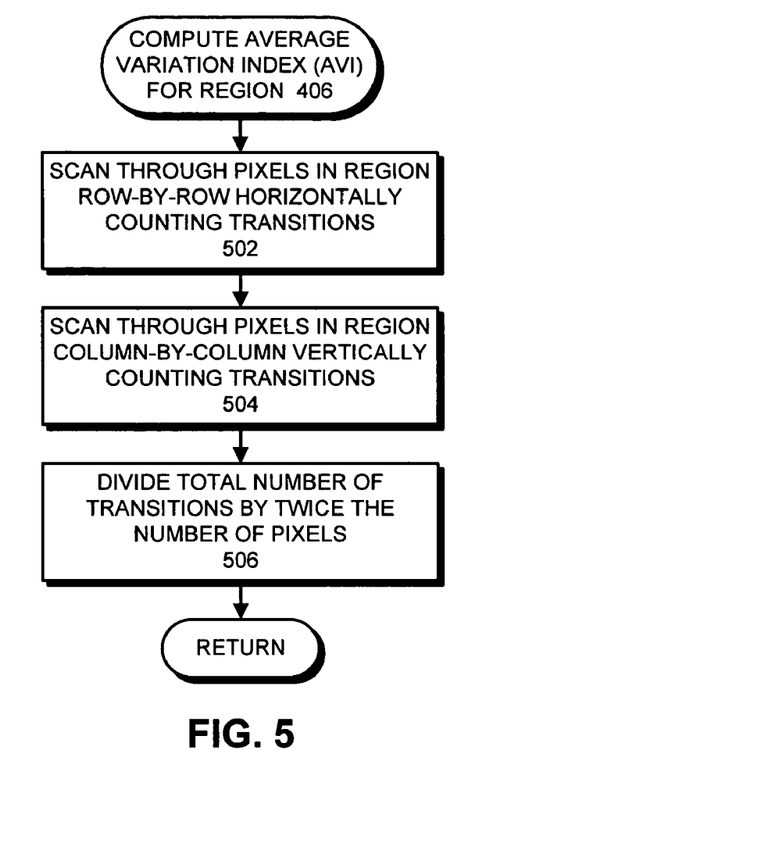
FIG. 5 presents a flow chart of the process of calculating a variation index for a region of a bi-level image in accordance with an embodiment of the present invention.

The process starts by computing an average variation index (AVI) for the region (step 406). Referring to FIG. 5, this involves scanning through pixels in the region row-by-row in a horizontal direction counting transitions from zero-to-one and from one-to-zero (step 502). It then involves scanning through pixels in the region column-by-column in a vertical direction counting transitions from zero-to-one and from one-to-zero (step 504). Finally, it involves dividing the total number of transitions by twice the number of pixels in the region to produce an average value which becomes the AVI (step 506).

Referring back to FIG. 4, after the AVI is computed, the system tests to see whether the AVI is greater than an upper threshold $t_{upper}$ (step 408). If so, the system determines that the region is a halftone region (step 410).

Otherwise, if the AVI is not greater than $t_{upper}$, the system tests to see whether the AVI is less than a lower threshold $t_{lower}$ (step 412). If the AVI is less than $t_{lower}$, the system tests to determine whether there are any black patches in the region (step 414). If so, the system determines that the region is a generic region (step 416). Otherwise, the system determines that the region is a symbol region (step 418).

If at step 412 the system determines that the AVI is not lower than $t_{lower}$, then $t_{lower} \geq AVI \geq t_{upper}$. In this case, the system tests to see whether there are any black patches in the region (step 420). If there are black patches in the region, the system tests to determine whether the AVI is greater than a middle threshold $t_{middle}$ (step 422). If so, the system determines that the region is a halftone region (step 410). Otherwise, the system determines that the region is a generic region (step 416).

On the other hand, if at step 420 the system determines that there are no black patches in the region, the system performs a morphological erosion operation on the region (step 424). Next, the system calculates AVI' for the eroded region (step 426), and then tests to see whether the AVI' is greater than a post-erosion threshold, $t_{post-erosion}$ (step 428). If so, the system determines that the region is a halftone region (step 410). Otherwise, the system determines that the region is a generic region (step 416).

Figure 6:
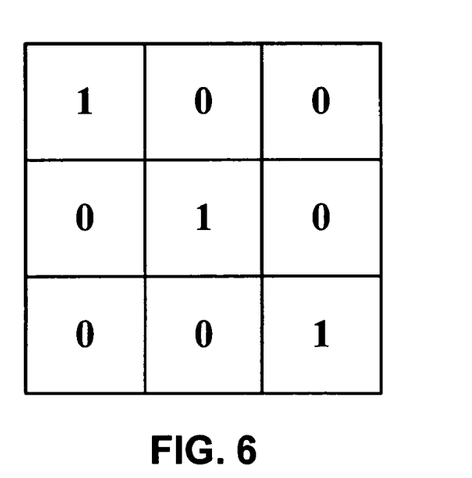
FIG. 6 illustrates a morphological structuring element in accordance with an embodiment of the present invention.

The above-described test on the eroded image is designed to isolate badly scanned images, where even text images show high variation index. During the erosion process, we can choose a structuring element to perform the morphological erosion operation, such as the 3×3 structuring element illustrated in FIG. 6. Note that other structuring elements are possible. The structuring element illustrated in FIG. 6, is just one of the possible configurations.

During the erosion process, this structuring element slides over the entire image. The current pixel is the center one. If in the image the current pixel is "black," we compare the 3×3 neighborhood of the current pixel with the structuring element. If there are two matches, we keep the current pixel "black." Otherwise, we turn it "white." Note that the term "match" means that the position of a 1 in the structuring element has a corresponding black pixel in the image. 0's in structuring element are insignificant. Hence, there can be anything in the image where structuring element contains 0.

After this morphological erosion process, the original image loses some of its characteristics and we get an eroded image. For example, text images lose most of their variation during erosion. After we calculate the AVI for the eroded image, we use a lower post-erosion threshold value for the variation index, because a halftone image will also lose some of its variation during the erosion process.

Note that the above-described techniques can also be used to differentiate thresholded images from halftone images. Some regions within a bi-level image may be created by "thresholding" a grayscale image at some level. These "thresholded images" generally have a lower AVI than halftone images.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying halftone regions, comprising: performing by a computer:
   receiving a region from a digital image, wherein the digital image is a bi-level image, wherein each pixel has two possible color values;
   computing a variation index for the region, wherein the variation index indicates how frequently adjacent pixel values in the region differ;
   in response to determining that the variation index for the region is between an upper threshold and a lower threshold, determining whether the variation index is above a middle threshold and the region contains black patches, wherein the variation index being greater than the upper threshold is indicative of the region being a halftone region and the variation index being less than the lower threshold is indicative of the region being a non-halftone region; and
   in response to determining that the variation index is above a middle threshold and that the region contains black patches, determining that the region is a halftone region.

2. The method of claim 1, further comprising:
   receiving an other region from the digital image, wherein the digital image is a bi-level image, wherein each pixel has two possible color values;
   computing a variation index for the other region, wherein the variation index for the other region indicates how frequently adjacent pixel values in the other region differ;
   in response to determining that the variation index for the other region is between the upper and lower thresholds: determining whether the variation index for the other region is below the middle threshold and the other region contains black patches;
   in response to determining that the variation index for the other region is below the middle threshold and the other region contains black patches, determining that the other region is a generic region which is neither a halftone region nor a symbol region.

3. The method for claim 1, further comprising:
   receiving an other region from the digital image, wherein the digital image is a bi-level image, wherein each pixel has two possible color values;
   computing a variation index for the other region, wherein the variation index for the other region indicates how frequently adjacent pixel values in the other region differ;
   in response to determining that the variation index for the other region is between the lower threshold and the upper threshold: testing to determine whether there exist black patches in the other region;
   in response to determining that no black patches exist in the other region:
      performing a morphological erosion on the other region;
      computing a new variation index for the eroded region;
      determining whether the new variation index is greater than a post-erosion threshold; and
      in response to determining that the new variation index is greater than the post-erosion threshold, determining that the other region is a halftone region.

4. The method of claim 1, wherein computing the variation index for the region involves:
   scanning through pixels in the region row-by-row in a horizontal direction counting transitions from zero-to-one and from one-to-zero;

scanning through pixels in the region column-by-column in a vertical direction counting transitions from zero-to-one and from one-to-zero; and dividing the total number of transitions by twice the number of pixels in the region.

5. The method of claim 1, further comprising encoding the halftone region using a different encoding technique than is used to encode a generic region or a symbol region.

6. The method of claim 5, wherein encoding the halftone region involves encoding the halftone region as a grayscale image with an associated halftone pattern dictionary.

7. The method of claim 1, wherein prior to receiving the region from the digital image, the method further comprises partitioning the digital image into different regions.

8. A computer-readable storage medium storing instructions that when executed by a computer cause the computer to perform:
   receiving a region from a digital image, wherein the digital image is a bi-level image, wherein each pixel has two possible color values;
   computing a variation index for the region, wherein the variation index indicates how frequently adjacent pixel values in the region differ; and
   if the variation index for the region is greater than an upper threshold, determining that the region is a halftone region;
   otherwise, if the variation index is lower than the upper threshold:
      testing to determine if black patches exist in the region; and
      if black patches exist and the variation index for the region is above a lower threshold and a middle threshold, determining that the region is halftone.

9. The computer-readable storage medium of claim 8, wherein the program instructions further cause the computer to perform:
   if the variation index for the region is between the upper and lower thresholds, and there exist black patches in the region and the variation index is lower than the middle threshold, determining that the region is a generic region which is neither a halftone region nor a symbol region.

10. The computer-readable storage medium for claim 8, wherein the program instructions further cause the computer to perform:
   if the variation index for the region is between the lower threshold and the upper threshold, and
   if no black patches exist in the region:
      performing a morphological erosion on the region;
      computing a new variation index for the eroded region; and
      if the new variation index is greater than a post-erosion threshold, determining that the region is a halftone region,
      otherwise, determining that the region is a generic region.

11. The computer-readable storage medium of claim 8, wherein computing the variation index for the region involves:
   scanning through pixels in the region row-by-row in a horizontal direction counting transitions from zero-to-one and from one-to-zero;
   scanning through pixels in the region column-by-column in a vertical direction counting transitions from zero-to-one and from one-to-zero; and
   dividing the total number of transitions by twice the number of pixels in the region.

12. The computer-readable storage medium of claim 8, wherein the method further comprises encoding the halftone region using a different encoding technique than is used to encode a generic region or a symbol region.

13. The computer-readable storage medium of claim 12, wherein encoding the halftone region involves encoding the halftone region as a grayscale image with an associated halftone pattern dictionary.

14. The computer-readable storage medium of claim 8, wherein prior to receiving the region from the digital image, the method further comprises partitioning the digital image into different regions.

15. An apparatus that identifies halftone regions within a digital image, comprising:
   a receiving mechanism configured to receive a region from the digital image, wherein the digital image is a bi-level image, wherein each pixel has two possible color values;
   an index-computing mechanism configured to compute a variation index for the region of the digital image, wherein the variation index indicates how frequently adjacent pixel values in the region differ; and
   an identification mechanism, wherein if the variation index for the region is greater than an upper threshold, the identification mechanism is configured to determine that the region is a halftone region; otherwise, if the variation index is lower than the upper threshold the identification mechanism is configured to determine if black patches exist in the region, and if black patches exist and the variation index for the region is above a lower threshold and above a middle threshold, determine that the region is halftone.

16. The apparatus of claim 15, if the variation index for the region is between the upper and lower thresholds, and there exist black patches in the region and the variation index is lower than the middle threshold, the identification mechanism is configured to determine that the region is a generic region which is neither a halftone region nor a symbol region.

17. The apparatus for claim 15, wherein if the variation index for the region is between the lower threshold and the upper threshold, the identification mechanism is configured to:
   test to determine whether there exist black patches in the region;
   wherein if black patches exist in the region, the identification mechanism is configured to:
      test to determine whether the variation index is greater than the middle threshold,
      if so, to determine that the region is a halftone region,
      if not, to determine that the region is a generic region; and
   wherein if no black patches exist in the region, the identification mechanism is configured to:
      perform a morphological erosion on the region;
      compute a new variation index for the eroded region; and
      if the new variation index is greater than a post-erosion threshold, determine that the region is a halftone region,
      otherwise, determine that the region is a generic region.

18. The apparatus of claim 15, wherein while computing the variation index for the region, the index-computing mechanism is configured to:
   scan through pixels in the region row-by-row in a horizontal direction counting transitions from zero-to-one and from one-to-zero;
   scan through pixels in the region column-by-column in a vertical direction counting transitions from zero-to-one and from one-to-zero; and to divide the total number of transitions by twice the number of pixels in the region.

19. The apparatus of claim 15, further comprising an encoding mechanism configured to encode the halftone region using a different encoding technique than is used to encode a generic region or a symbol region.

20. The apparatus of claim 19, wherein the encoring mechanism is configured to encode the halftone region as a grayscale image with an associated halftone pattern dictionary.

* * * * *